(12) United States Patent
Warren et al.

(10) Patent No.: US 12,169,118 B2
(45) Date of Patent: Dec. 17, 2024

(54) BALLISTIC RESISTANT MATERIAL

(71) Applicant: Synthetik Applied Technologies, LLC, Austin, TX (US)

(72) Inventors: James Arthur Warren, Houston, TX (US); Jason Lovaine Blaylock, Houston, TX (US)

(73) Assignee: Synthetic Applied Technologies LLC, Austin, TX (US)

( * ) Notice: Subject to any disclaimer, the term of this patent is extended or adjusted under 35 U.S.C. 154(b) by 250 days.

(21) Appl. No.: 17/173,159

(22) Filed: Feb. 10, 2021

(65) Prior Publication Data

US 2021/0404771 A1    Dec. 30, 2021

Related U.S. Application Data

(60) Provisional application No. 62/972,583, filed on Feb. 10, 2020.

(51) Int. Cl.
| | | |
|---|---|---|
| *F41H 5/00* | (2006.01) | |
| *B29C 39/00* | (2006.01) | |
| *B29C 39/10* | (2006.01) | |
| *B29C 39/24* | (2006.01) | |
| *C08J 3/20* | (2006.01) | |
| *C08K 3/34* | (2006.01) | |

(Continued)

(52) U.S. Cl.
CPC .............. *F41H 5/00* (2013.01); *B29C 39/006* (2013.01); *B29C 39/10* (2013.01); *B29C 39/24* (2013.01); *C08J 3/20* (2013.01); *C08K 3/34* (2013.01); *B29K 2075/00* (2013.01); *B29K 2709/08* (2013.01); *C08J 2375/04* (2013.01); *C08K 2201/003* (2013.01); *C08K 2201/009* (2013.01)

(58) Field of Classification Search
None
See application file for complete search history.

(56) References Cited

U.S. PATENT DOCUMENTS

| | | | |
|---|---|---|---|
| 10,627,193 B1 * | 4/2020 | Meyers | F41H 5/0428 |
| 2012/0186425 A1 * | 7/2012 | Kocher | F41H 5/0492 |
| | | | 89/929 |

(Continued)

FOREIGN PATENT DOCUMENTS

| | | | |
|---|---|---|---|
| WO | WO-2009060447 A2 * | 5/2009 | ........... F41H 5/0471 |
| WO | 2009111302 | 9/2009 | |
| WO | 2020018539 | 1/2020 | |

OTHER PUBLICATIONS

International Search Report for App. No. PCT/US21/17510.
Israeli Office Action issued in App. No. IL, dated Mar. 5, 2023, 2 pages.

*Primary Examiner* — Robert J Grun
(74) *Attorney, Agent, or Firm* — Ferguson Case Orr Paterson LLP

(57) ABSTRACT

A composite material system having an aggregate bound by an elastomer encapsulant. The composite material (CM) is designed to defeat impinging projectiles by converting the kinetic energy (KE) in the projectile to damage in the aggregate and the elastomer and increasing the thermal energy in the CM and the projectile via frictional heating. In one embodiment, the CM comprises certain kinds of rocks encapsulated (or bound) in a hyper-elastic polymer, such as polyurethane ("PU"). The CM may be shaped into convenient shapes from modular assembly to create a ballistic resistant surface.

11 Claims, 5 Drawing Sheets

(51) Int. Cl.
    *B29K 75/00*     (2006.01)
    *B29K 709/08*     (2006.01)

(56) References Cited

U.S. PATENT DOCUMENTS

| | | |
|---|---|---|
| 2014/0277641 A1 | 9/2014 | Bilobrov |
| 2014/0287641 A1 | 9/2014 | Steiner, III |
| 2015/0253114 A1 | 9/2015 | Neal |
| 2017/0241747 A1 | 8/2017 | Ganor |
| 2020/0354886 A1 | 11/2020 | Bhatnagar |

\* cited by examiner

BALLISTIC RESISTANT MATERIAL

RELATED APPLICATION

This application claims the benefit of U.S. Prov. Pat. App. No. 62/972,583, filed on Feb. 10, 2020, which is incorporated by reference as if set forth fully herein.

BACKGROUND OF THE DISCLOSURE

Field of the Disclosure

The disclosure relates to ballistic resistant materials, systems and structures incorporating those materials, and methods of making the same.

Description of Related Art

Traditionally, measures including barriers such as steel, concrete, dirt, or gravel, have been used as the primary protection against explosions for assets, including, but not limited to, a person, infrastructure, vehicle. Infrastructure may be any infrastructure. For example, and without limitation, infrastructure may include buildings, bridges, military installations, refineries, public works infrastructure (e.g., wastewater treatment facilities), utilities infrastructure (e.g., electrical substation), or oilfield infrastructure. Vehicles may be any land, air, or sea-based vehicle. For example, and without limitation, vehicles may include cars, trucks, tanks, aircraft, ships, or boats. Typical barriers can be heavy, bulky, and difficult to assemble in the field.

Thus, there is a need for a lightweight, relatively compact material for use in ballistic barriers that is easily manufactured, transported, and assembled for use in both static and mobile applications.

DETAILED DESCRIPTION OF THE DISCLOSURE

Figure 1:
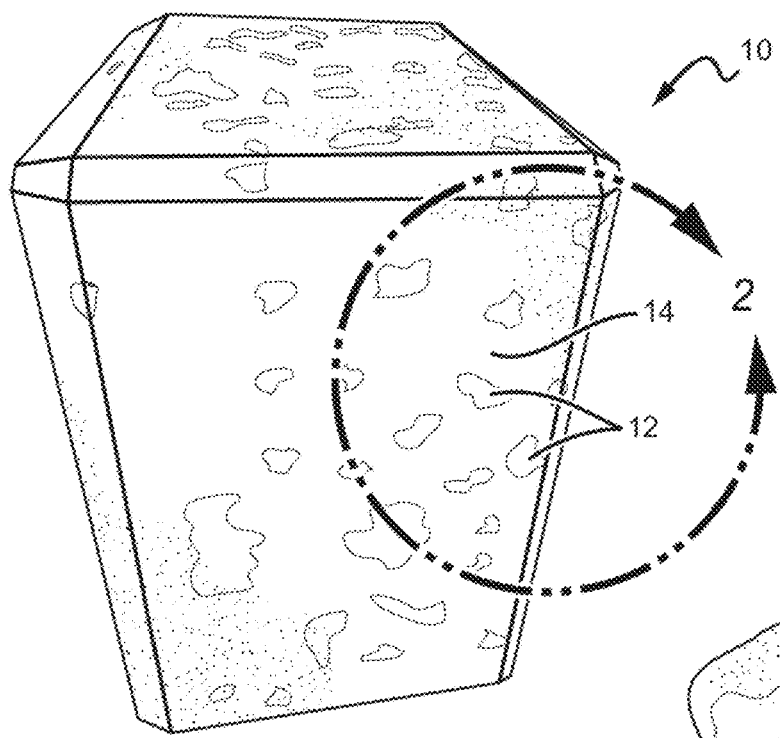
FIG. 1 is a perspective view of a CM structure 10 according to an embodiment of the present disclosure which has been formed into a generally rectangular block.

Throughout this disclosure, the embodiments illustrated should be considered as exemplars, rather than as limitations on the present disclosure. As used herein, the term "composition," "device," "structure," "method," "disclosure," "present composition," "present device," "present structure," "present method," or "present disclosure" refers to any one of the embodiments of the disclosure described herein, and any equivalents. Furthermore, reference to various feature(s) of the "composition," "device," "structure," "method," "disclosure," "present composition," "present device," "present apparatus," "present method," or "present disclosure" throughout this document does not mean that all claimed embodiments or methods must include the referenced feature(s).

It is also understood that when an element or feature is referred to as being "on" or "adjacent" to another element or feature, it can be directly on or adjacent the other element or feature, or intervening elements or features may also be present. In contrast, when an element is referred to as being "directly on" or extending "directly onto" another element, there are no intervening elements present. Additionally, it is understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Furthermore, relative terms such as "inner," "outer," "upper," "top," "above," "lower," "bottom," "beneath," "below," and similar terms, may be used herein to describe a relationship of one element to another. Terms such as "higher," "lower," "wider," "narrower," and similar terms, may be used herein to describe angular relationships. It is understood that these terms are intended to encompass different orientations of the elements or system in addition to the orientation depicted in the figures.

Although the ordinal terms first, second, third, etc., may be used herein to describe various elements, components, regions, and/or sections, these elements, components, regions, and/or sections should not be limited by these terms. These terms are only used to distinguish one element, component, region, or section from another. Thus, unless expressly stated otherwise, a first element, component, region, or section discussed below could be termed a second element, component, region, or section without departing from the teachings of the present disclosure. As used herein, the term "and/or" includes any and all combinations of one or more of the associated list items.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. For example, when the present specification refers to "an" assembly, it is understood that this language encompasses a single assembly or a plurality or array of assemblies. It is further understood that the terms "comprises," "comprising," "includes," and/or "including" when used herein, specify the presence of stated features, integers, steps, operations, elements, and/or components, but do not preclude the presence or addition of one or more other features, integers, steps, operations, elements, components, and/or groups thereof.

Embodiments as described in the present disclosure reference can be described herein with to view illustrations that are schematic in nature. As such, the actual thickness of elements can be different, and variations from the shapes of the illustrations as a result, for example, of manufacturing techniques and/or tolerances are expected. Thus, the elements illustrated in the figures are schematic in nature and their shapes are not intended to illustrate the precise shape of a region and are not intended to limit the scope of the disclosure.

Embodiments of the present disclosure include composite systems comprising an aggregate bound by an elastomer. The composite material (CM) is designed to defeat impinging projectiles by converting the kinetic energy (KE) in the projectile to damage in the aggregate and the elastomer and increasing the thermal energy in the CM and the projectile via frictional heating. In one embodiment, the CM comprises certain kinds of rocks encapsulated (or bound) in a hyper-elastic polymer, such as polyurethane ("PU"), for example. Many different aggregate/encapsulant combinations are possible.

Without being bound by any particular scientific theory, the CM operates to defeat high-speed projectiles in several ways. First, if the projectile speed is above a certain threshold (in some embodiments, approximately 700 m/s), it will generate a shock wave. As the projectile approaches the front surface of the CM structure, the shock wave is driven into the material. In the encapsulant, the shock wave acts as a compressive wave which compresses and confines the aggregate at a higher triaxial stress than the residual stress field from the manufacture. The confining stress for a single piece of aggregate is now the sum of inertial forces plus the compressive stress induced by the shock wave, until such a time as a release wave from the distal plane of the target arrives to release this compressive stress, and the material reverts to a state which is typical when incident projectiles are traveling at speeds that are slower than the threshold speed as described below.

When the speed of the incident projectile is below the shock threshold, the confining stress is the basic inertial force of the surrounding material. The projectile erodes any surface elastomer, reducing impactor KE in the process and increasing the heat energy in the target. The projectile impacts a piece of aggregate and imparts KE. The stresses in the aggregate rise until fracture threshold is reached at which point micro-fractures coalesce and a principle fracture occurs. However, due to lateral confinement provided by the elastomer, and enhanced if in the shocked state, this damaged piece of aggregate cannot accelerate laterally immediately. Therefore, the projectile "dwells" and continues to apply load and transfer energy. This continues the breakdown of the piece of aggregate as the projectile induces increasing numbers of fractures converting the impact area to a dust-like sand in extreme cases. If sufficient energy still exists in the projectile, it will pass through this damaged region, and the process will continue with additional pieces of aggregate.

When dealing with projectiles with high aspect ratios (i.e., a length to diameter ratio greater than unity), the process of erosion through a non-uniform density continuum induces a rotational moment to the projectile and induces tumbling. This has the effect of increasing the surface area impacting the CM in the direction of motion at any given time. This, in turn, has the effect of reducing the applied stress to the aggregate during the energy transfer mechanism, reducing overall damage while converting projectile KE to internal target energy. Tumbling may also cause the projectile to be bent and/or broken by the aggregate. This internal energy can be considered to be the sum of the KE in the target, the heat energy in the target, and the surface (fracture) energy expended in the target.

If the projectile has sufficient energy, it will move through the damaged piece of aggregate, encountering high frictional forces, increasing the heat energy of the CM, and reducing projectile KE. In the case where a projectile moves between pieces of aggregate, it encounters high viscoelastic drag forces from the elastomer, increasing the heat state of the CM and reducing projectile KE. As the projectile passes through the CM it is affected in each of the ways described above until it either is arrested by the CM, or until it emerges from the distal face of the CM with whatever residual energy it has left.

Aggregate

Aggregate is the component of the CM that resists compressive stress and provides bulk to the composite material. Many different material combinations may be used with one suitable combination being a concrete aggregate in a polyurethane encapsulant. The size and hardness of the aggregate are important characteristics to consider in designing the CM, especially in relation to the size ratio) of (aspect and hardness the anticipated threat projectile. In some embodiments, the range of aggregate-to-projectile length ratio will range from 4:1 to 1:1 for projectile sizes in the range of about 5.5 mm to 20 mm in diameter (d). An optimal ratio is about 3.7:1 for a volume of unrestrained aggregate (e.g., a bag of rocks).

In one embodiment, the aggregate is defined in BS-EN 12620 as being a graded aggregate, 20 mm down. This means that there is a gradation of the aggregate from a maximum size of about 20 mm in diameter to a minimum size of less than about 0.1 mm in diameter. In one suitable embodiment, the particle size distribution exhibits peaks in two ranges: 20 mm>d>15 mm; and d>0.1 mm. The aggregate may be separated using a 20 mm sieve and then a 15 mm sieve to achieve a particular size distribution. The compressive strength of this material has not been specified, and, being a natural material, it is likely to vary over a wide range. The material group definition for this one embodiment would be quartz, crystalline quartz, or quartzite. Other suitable aggregate materials include boron carbide, aluminum nitride, or alumina, for example.

Elastomer

In this particular embodiment, the encapsulant is polyurethane ("PU"). PU is specified by hardness with suitable PU materials ranging between 50 D and 60 A on the Shore hardness scale. This range allows for different responses given an intended operating temperature range. Deployment in high temperature environments would require a higher hardness at room temperature to allow for viscosity drop at higher temperatures. Many different polymer materials may be used, with several materials from the polyurea family being suitable for use in most general applications of the CM. The elastomer material should always be selected in view of the temperature and other characteristics of the environment where the CM will be used to ensure that, in cold environments, the brittle limit is not reached and, in hot environments, the viscosity does not fall to an unacceptable level.

FIG. 1 is a perspective view of a CM structure 10 according to an embodiment of the present disclosure which has been formed into a generally rectangular block. The structure 10 comprises a quartzite aggregate 12 which is bound in a PU encapsulant 14.

Figure 2:
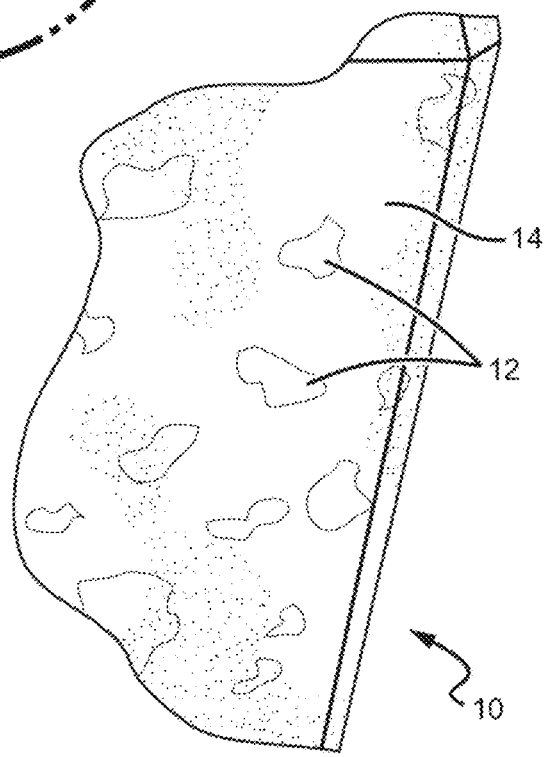
FIG. 2 is a close-up view of a surface of the CM structure 10.

FIG. 2 is a close-up view of a surface of the CM structure 10. Pieces of the aggregate 12 are visible within the encapsulant 14 just beneath the surface of the structure 10.

Figure 3:
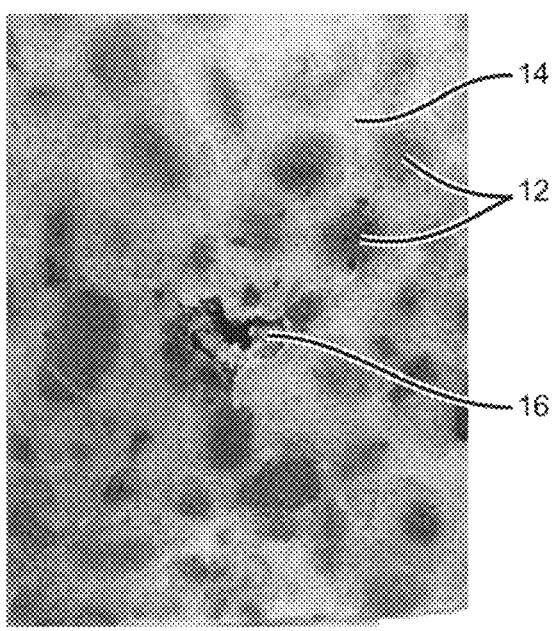
FIG. 3 is a close-up view of the CM structure 10 after a test fragment has impacted and at least partially penetrated the surface thereof.

FIG. 3 is a close-up view of the structure 10 after a test fragment has impacted and at least partially penetrated the surface thereof.

Manufacturing Process

Figure 4:
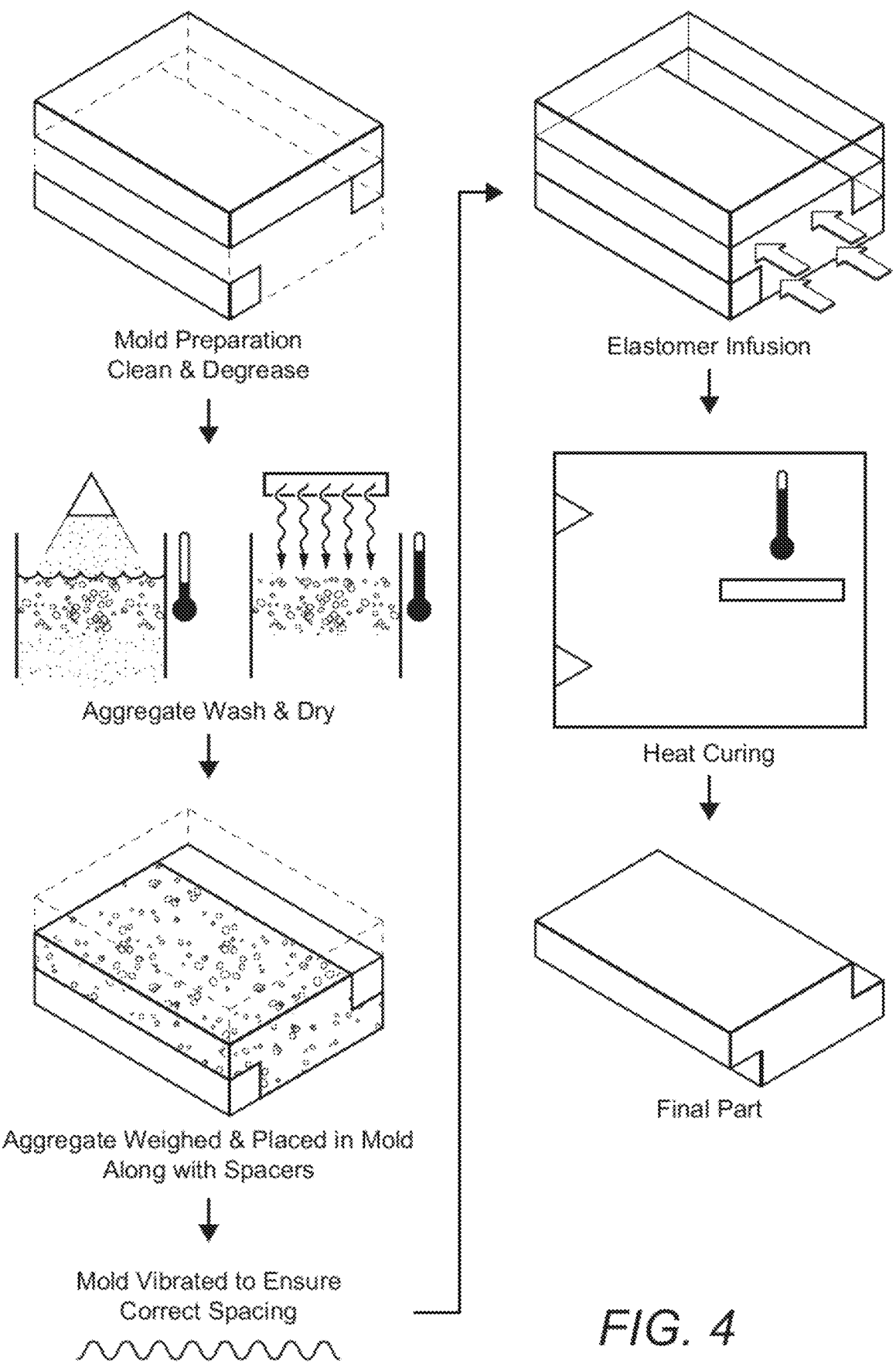
FIG. 4 is a flowchart illustrating a method of manufacturing a composite material system according to the present disclosure.

In one embodiment, the composite material is prepared in molds and cast-poured from the base. FIG. 4 shows one such method according to the present disclosure. A mold is prepared that defines the geometry of the required structure (step 1). Before placement in the mold, the aggregate is washed to remove any fine material that may interfere with the polymerization process of the PU, and then dried (step 2). The dry, washed aggregate is then poured into the mold along with spacers (step 3). The desired bulk density for a particular structure is known, so the appropriate amount of aggregate is poured into the mold and then may be gently vibrated to uniformly settle the aggregate within the mold and to maximize the amount of material to be utilized (step 4).

The bulk density of the material should be selected such that performance of the structure is adequate for defeating a particular projectile threat but also such that the manufacturing process is feasible and economical. The bulk density is broadly in line with geometry and particle size. Where possible, the aggregate should be vibrated to as close to peak theoretical density as possible. For common aggregate this may range between 1,400 kg/m$^3$ and 1,700 kg/m$^3$. However, engineered (manufactured) aggregates may have a higher range and may be suited to high end threats.

The two-part PU is then introduced into the mold at the base to ensure that no voids are present post-process (step 5). The PU up-fills the mold, and then, once most of the gas has bubbled to the surface of the material, the top surface may be skimmed to remove the top thin layer of material that includes the bubbles. The layer of the CM at the top of the mold will typically form the external facing surface of the manufactured structure. Thus, in some cases, it is desirable to have a smooth finish on this surface so that it may be painted or otherwise treated. This smooth externally-facing layer of PU may be thin, for example, a millimeter to a few millimeters thick.

After skimming the top layer of material off, a small meniscus will form on the material. A bit more PU material may then be introduced to top up the mold. Once the mold is full, it is transferred to an oven for curing (step 6). After curing, the part is allowed to cool, removed from the mold, and then inspected for release (step 7).

Using this process, it is possible to build CM structures having many different shapes. For example, in some applications, it is desirable to build the CM structures as blocks, planks, or slabs that may be fit together to build structures such as walls, ceilings, or entire buildings. The blocks may be gravity-joined, they may include male/female structures for stack-joining, and they may be joined using adhesives. It is possible to manufacture blocks designed to form tessellated structures where portions of the slabs overlap to provide additional protection in areas where adjacent blocks are joined.

Figure 5A:
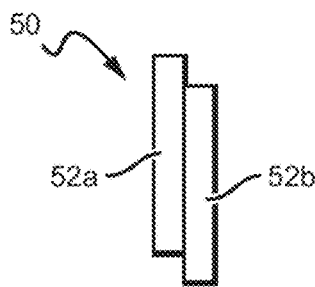
FIG. 5A is a left end elevation view of a block 50.
Figure 5D:
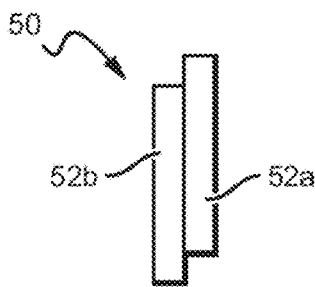
FIG. 5D is a right end elevation view of the block 50.
Figure 5G:
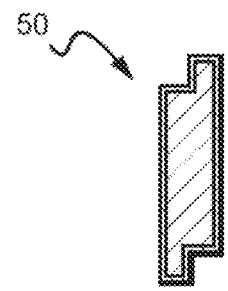
FIG. 5G is a cross-sectional view taken along section line C-C of the block 50.
Figure 5B:
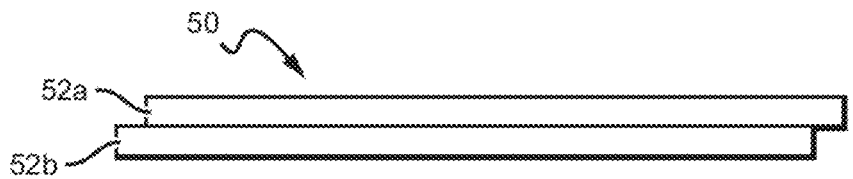
FIG. 5B is top elevation view of the block 50.
Figure 5C:
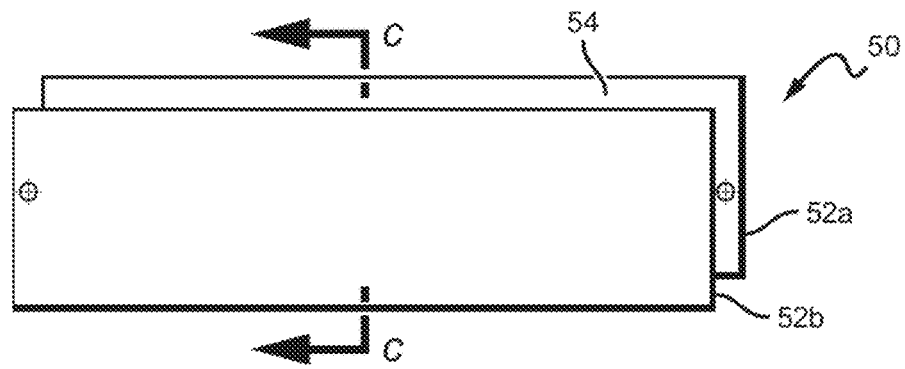
FIG. 5C is a front elevation view of the block 50.
Figure 5E:
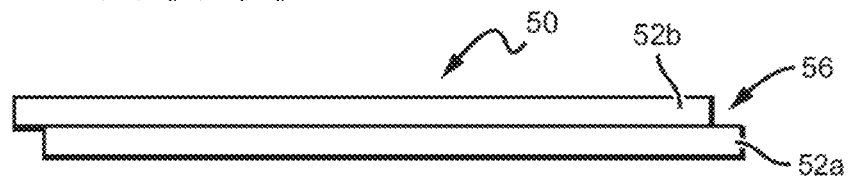
FIG. 5E is a bottom elevation view of the block 50.
Figure 5F:
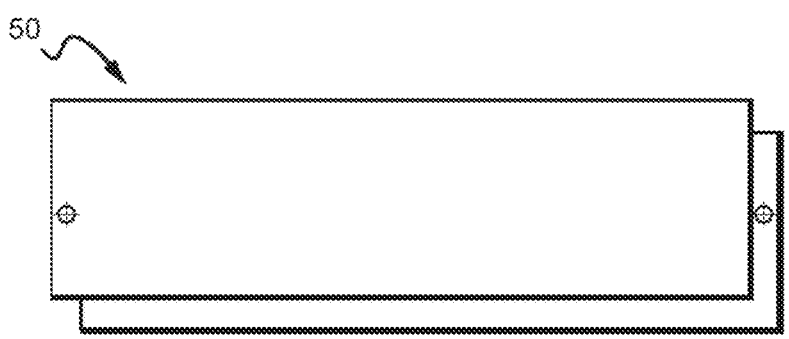
FIG. 5F is a back elevation view of the block 50.

FIGS. 5A-5G show various views of an embodiment of a CM block 50 that may be used as a basic unit in building more complex CM structures. FIG. 5A is a left end elevation view of the block 50. FIG. 5B is top elevation view of the block 50. FIG. 5C is a front elevation view of the block 50. FIG. 5D is a right end elevation view of the block 50. FIG. 5E is a bottom elevation view of the block 50. FIG. 5F is a back elevation view of the block 50. FIG. 5G is a cross-sectional view taken along section line C-C of the block 50.

FIGS. 5A-5G provide exemplary relative dimensions for one embodiment of the block 50. It is understood that the relative dimensions of similar CM structures may vary widely depending on the intended application for a particular structure. The relative dimensions provided in the figures are merely exemplary and in no way intended to limit the scope of the disclosure.

In this particular embodiment, each block 50 comprises two horizontal slabs 52a, 52b that are joined together such that the slabs 52a, 52b are offset from each other in two directions, for example, the horizontal and vertical directions to create positive and negative offset portions as shown. Adjacent blocks may be joined such that the positive offset portion of one of the blocks cooperates with a negative offset portion of an adjacent block to form an overlapping joint. In the embodiment shown in FIGS. 6A-6G, the offset creates a ridge 54 around the exterior of the block along two adjacent edges and a corresponding indentation 56 around the other two adjacent edges. This structure allows the blocks 50 to be fit together while preventing slippage in two directions simultaneously. In this embodiment, the block base shape is substantially rectangular; however, it is understood that many different base shapes may be used to create tessellated patterns for building more complex structures. The blocks 50 can be joined together in many different ways, including screws, adhesives, and other fasteners.

It is also possible to build complex shapes in a piecemeal fashion. For example, two halves of a complex shape can be formed in separate molds, then part-cured so that the two halves retain their shape but are sticky coming out of the molds. After the part-cured halves are removed from their respective molds, they can be pressed together to form desired combined shape and then placed back into the oven to finish the curing process and harden the combined shape.

Figure 6A:
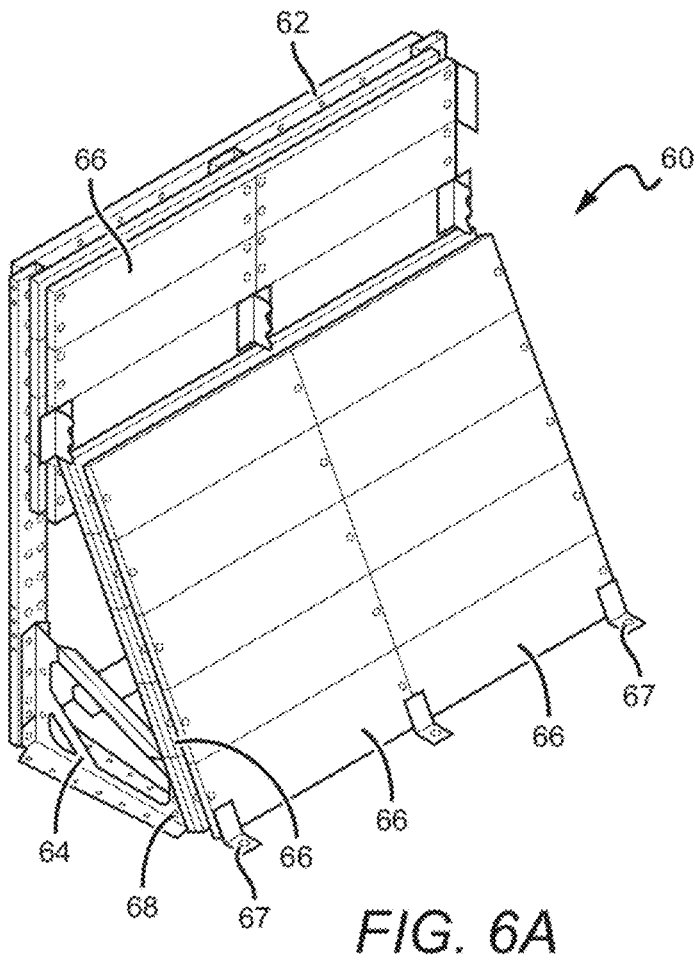
FIG. 6A is a perspective view of a blast protection system 60 according to an embodiment of the present disclosure.
Figure 6C:
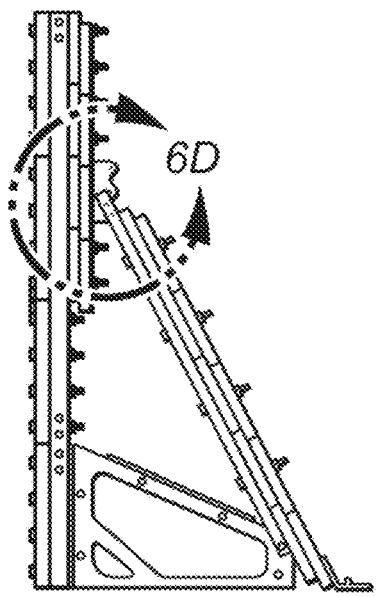
FIG. 6C is a right side elevation view of the blast protection system 60.
Figure 6B:
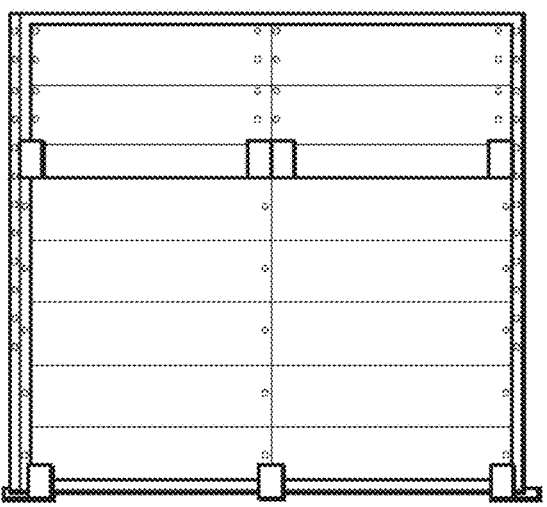
FIG. 6B is a rear elevation view of the blast protection system 60.
Figure 6D:
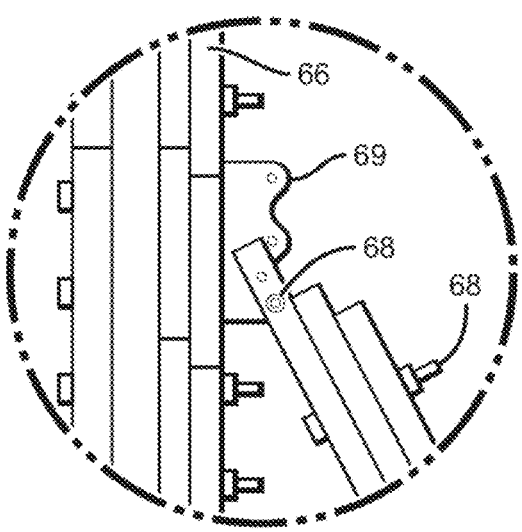
FIG. 6D is a close-up of a portion of the blast protection system 60.

The blocks may be incorporated into metal (e.g., steel) frames for modular deployment in the field. One exemplary embodiment of a blast protection system 60 is shown in FIGS. 6A-6D. FIG. 6A is a perspective view of the blast protection system 60. FIG. 6B is a rear elevation view of the blast protection system 60. FIG. 6C is a right side elevation view of the blast protection system 60. FIG. 6D is a close-up of a portion of the blast protection system 60.

The blast protection system 60 comprises blast panels 62 on the front side of a frame 64, and CM slabs 66 on the back side of the frame 64. In this particular system, the frame 64 comprises a vertical portion and a horizontal portion that extends along the floor a distance away from the vertical portion. Thus, to accommodate this standoff, CM slabs may be attached along an angled portion of the frame 64 to provide complete coverage from the top of the frame 64 to the floor or other horizontal surface to which the frame 64 is mounted.

Various fasteners and brackets may be used to join the components of the system 60. For example, in this embodiment, fasteners 68 comprise bolts of varying length. Bracket 69 (best shown in FIG. 6D) may be used to connect the vertical and diagonal portions of the system 60. It is understood that many different kinds of fasteners and brackets may be used and that these components will be dictated by the specifications of the intended application.

The framed slabs 66, and the frame 64 and panels 62 themselves, are relatively light weight and thus easily transported for assembly, maintenance, and replacement. The structures are modular, and thus may be scalable both vertically and horizontally to outfit buildings of various size. The panels 62 and the CM slabs are easily attached to and detached from the frame 64 to create a portable modular blast protection system 60 that can easily be deployed in the field and customized to protect structures or assets of nearly any shape or size. The system 60 may come as a kit that can be built with a specific purpose in mind, or individual components of the kit may be provided for customized builds or retrofit applications.

Figure 7C:
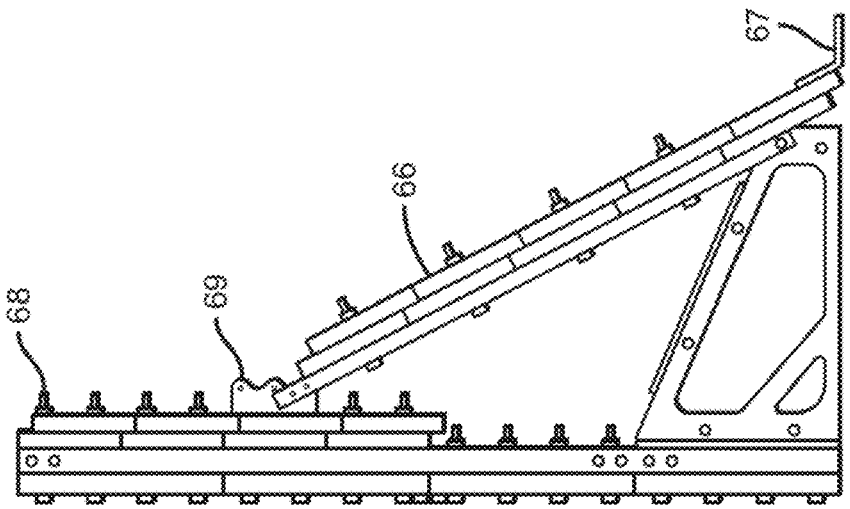
FIGS. 7A-7C show the system 60 in various stages of assembly.
Figure 7B:
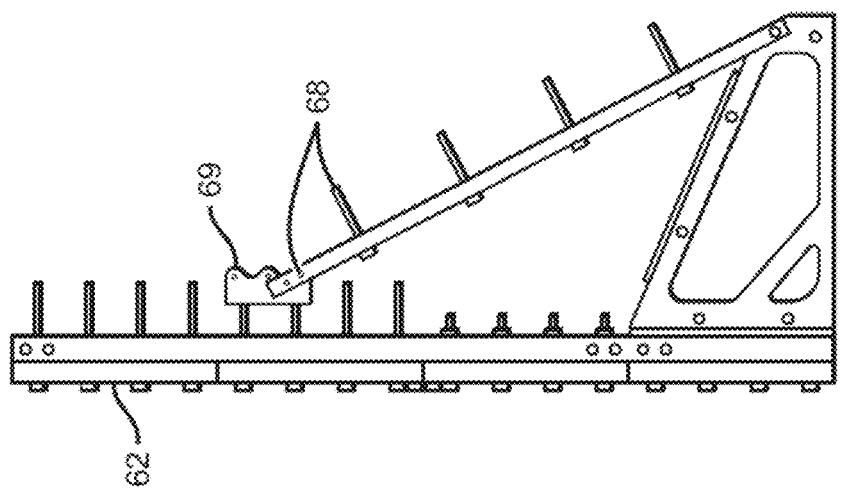
Figure 7A:
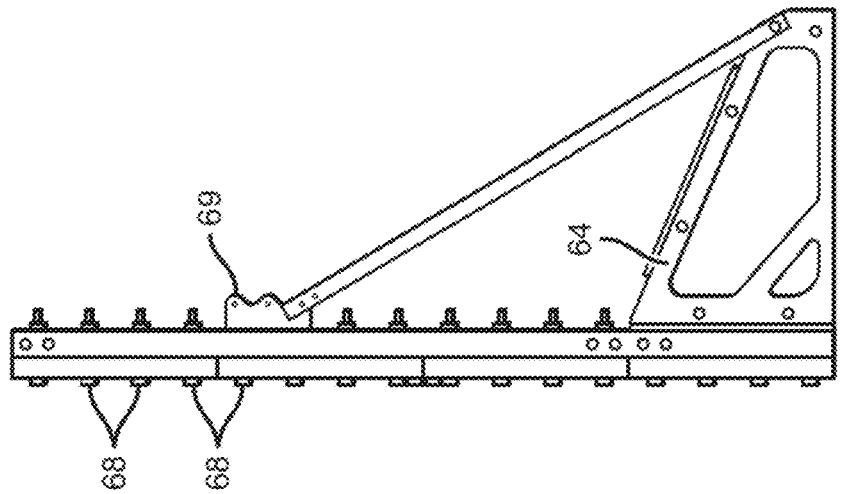

FIGS. 7A-7C show the system 60 in various stages of assembly. FIG. 7A shows the system 60 prior to attachment of the CM slabs 66 with the front side blast panels 62 attached to the fame 64 with fasteners 68. In FIG. 7B, longer fasteners are used to provide room for the slabs 66 that will be attached to the back side of the frame 64. In FIG. 6C, the slabs 66 are attached between the frame 64 and the bracket 69. Additional slabs 66 are attached to the back side of the diagonal portion of the frame to provide complete back side coverage. The slabs may be secured to the floor (or another surface) using angled brackets 67 as ground anchors, for example. Other fasteners may also be used.

Although the present invention has been described in detail with reference to certain preferred configurations thereof, other versions are possible. Embodiments of the present invention can comprise any combination of compatible features shown in the various figures and can comprise any combination of materials discussed or referenced in the disclosure, and these embodiments should not be limited to those expressly illustrated and discussed. Therefore, the spirit and scope of the invention should not be limited to the versions described above.

We claim:

1. A composite material structure, comprising:
    an aggregate comprising a plurality of particles that are graded over a range of average particle sizes, wherein said range of average particle sizes of said aggregate has a maximum size of about 30 mm in diameter and a minimum size of about 0.1 mm in diameter, wherein said aggregate is configured to a density within a range of 1,400 kg/m$^3$ and 1,700 kg/m$^3$; and
    an encapsulant comprising an elastomer;
    wherein said aggregate is distributed throughout said encapsulant such that said structure stops or significantly impedes a projectile that is incident upon said composite material structure.

2. The composite material structure of claim 1, wherein said aggregate comprises a material selected from the group consisting of quartz, crystalline quartz, and quartzite.

3. The composite material structure of claim 1, wherein said aggregate comprises a distribution of average particle sizes with peak densities in the range between about 20 mm and about 15 mm and in the range slightly greater than 0.1 mm.

4. The composite material structure of claim 1, wherein said minimum size of said average particle sizes of said aggregate is about 5 mm in diameter.

5. The composite material structure of claim 1, wherein said range of average particle sizes of said aggregate has a maximum size of about 20 mm in diameter and a minimum size of about 10 mm in diameter.

6. The composite material structure of claim 1, wherein said encapsulant comprises polyurethane and said aggregate comprises concrete.

7. The composite material structure of claim 6, wherein said polyurethane has a Shore hardness of between 50 D and 60 A.

8. The composite material structure of claim 1, wherein said structure is shaped as a slab.

9. The composite material structure of claim 8, wherein said slab is shaped to fit together with other slabs with a portion of adjacent slabs overlapping at a joint between slabs.

10. A method of manufacturing a composite material structure, comprising: providing a mold having a particular shape; washing and drying an aggregate material; placing an amount of said aggregate material in said mold, said aggregate configured to a density between 1,400 kg/m$^3$ and 1,700 kg/m$^3$, wherein said amount of said aggregate material is determined by a desired density for said composite material structure; vibrating the aggregate within the mold to uniformly settle the aggregate within the mold; introducing a liquid elastomer encapsulant into said mold at a base of said mold such that said encapsulant upfills said mold around said aggregate; curing said encapsulant within said mold; and removing said composite material structure from said mold.

11. The method of claim 10, further comprising:
    after introducing said liquid encapsulant into said mold and prior to curing, skimming a layer of said encapsulant off the top of said mold; and
    after curing said composite material structure, applying a finish to a top surface of said composite material structure.

* * * * *